United States Patent [19]

Szanto et al.

[11] 3,876,778

[45] Apr. 8, 1975

[54] USE OF ANTIBIOTICS OF THE STREPTOTHRICIN FAMILY AS TAENIACIDAL AGENTS

[75] Inventors: Joseph Szanto, Flemington; William E. Brown, Princeton; Edward Meyers, East Brunswick, all of N.J.

[73] Assignee: E. R. Squibb & Sons, Inc., Princeton, N.J.

[22] Filed: Apr. 22, 1974

[21] Appl. No.: 462,689

[52] U.S. Cl. ............................................. 424/181
[51] Int. Cl. .......................................... A61k 21/00
[58] Field of Search ................................... 424/181

[56] References Cited
OTHER PUBLICATIONS

Chemical Abstracts – 5th Decennial Index, Vol. 41–50, (1947–1956), page 12022S.

*Primary Examiner*—Sam Rosen
*Attorney, Agent, or Firm*—Lawrence S. Levinson; Merle J. Smith; Stephen B. Davis

[57] ABSTRACT

Certain antibiotics of the streptothricin family including streptothricin, S 15-1, and 156 B-1 are useful as taeniacidal agents.

11 Claims, No Drawings

USE OF ANTIBIOTICS OF THE STREPTOTHRICIN FAMILY AS TAENIACIDAL AGENTS

Summary of the Invention

This invention is directed to the use of certain antibiotics of the streptothricin family as taeniacidal agents.

Detailed Description of the Invention

Tapeworms cause widespread and serious infection in mammals such as dogs, cats, sheep, goats, etc. The infected animals represent both a health hazard as well as serious economic loss. Certain antibiotics of the streptothricin family including streptothricin, S 15–1, and 156 B–1 have been found to be effective taeniacidal agents. The antibiotic 156 B–1 has also been referred to in the literature as 24010 B–1.

In treating animals infected with tapeworms, the antibiotics of this invention can be formulated according to conventional pharmaceutical and veterinary practice. Thus, the antibiotic or a mixture of the antibiotics set forth above can be encapsulated with various materials such as gelatine or can be formulated as tablets, suspensions, etc., or can be mixed with a pharmaceutically acceptable carrier to form a feed supplement which can be incorporated in the animal feed in the desired concentration. The taeniacidal agents of the present invention can be combined with other parasiticides such as nematocide agents as for example dichlorvos or thiabendazole.

The preferred dosage level for treating a tapeworm infection will depend to a large extent on the particular antibiotic employed, on the severity of the infection and on the particular species of animal to be treated. For example, an acceptable dose level may be higher in ruminants such as sheep than in other animals such as dogs or cats. In general, the antibiotics exhibit taeniacidal activity when administered to animals in a daily dose of about 5 to about 200 mg. per kilogram of body weight. It is preferred to employ in the range of 25 to 100 mg. per kilogram of body weight per day. The antibiotics may be given in a single dose or divided into a series of smaller doses. If desired, the course of treatment may be extended over a period of days in which case the optimum daily dose level may be lowered.

The antibiotics of the present invention in the described dosages are intended to be administered orally.

Various methods for the production of the antibiotic streptothricin as well as the physico-chemical and biological properties of this antibiotic are known to those skilled in the art.

The microorganism useful for the preparation of antibiotic S 15–1, classified as a strain of the genus *Streptomyces griseocarneus*, was isolated from soil collected in the suburbs of Sendai City, Miyagi Prefecture, Japan. A culture of the living organism has been deposited in and is available from the culture collection of the U.S. Department of Agriculture, Northern Regional Research Laboratory (Peoria, Illinois), where it has been assigned the number NRRL 5311.

The microbial characteristics of the microorganism are as follows:

I. Morphological characteristics

Growth in media with hyphae, as seen in actinomycetes in general. Aerial mycelium, long and filamentous, or abundantly branched, sometimes slightly hooked; no whorls and no spirals. Ten or more conidia in chains at the tip of aerial mycelium, ellipsoidal or cylindrical, 0.6 to 0.7 by 1.1 to 1.3 microns. Spores, smooth surface.

II. Behavior on various culture media:

1. Czapeks' Dox agar plate (27°C):
   Growth cream-colored; aerial mycelium scant, white; no soluble pigment.
2. Glucose-asparagine agar plate (27°C):
   Colorless growth; aerial mycelium white, powdery, scant. No soluble pigment.
3. Starch synthetic agar plate (27°C):
   Colorless growth; white to ash-gray aerial mycelium, well developed. Gray soluble pigment, scant. Starch is actively hydrolyzed.
4. Ca-malate agar plate (27°C):
   Colorless growth, aerial mycelium scant, white. No soluble pigment.
5. 0.2% Sodium nitrate-incorporated peptone water (30°C):
   Colorless growth in masses at the bottom. No soluble pigment. Nitrites produced from nitrates.
6. Broth agar slant (27°C):
   Growth grayish yellow, wrinkled, no aerial mycelium. Pale brown soluble pigment.
7. Sugar-incorporated broth agar slant (27°C):
   Growth grayish yellow, wrinkled; aerial mycelium scant, white. Pale brown soluble pigment.
8. Coagulated Loeffler's blood serum slant (27°C):
   Growth white to ash-gray; no aerial mycelium. Soluble pigment gray to grayish black. No liquefaction. No growth at 37°C.
9. Bennett's agar plate (27°C):
   Growth yellow; thick aerial mycelium, pinkish gray. Pale brown soluble pigment. No growth at 37°C.
10. Gelatin (12°C):
    Growth colorless to pale brown; white, thick aerial mycelium in stab. Slow liquefaction. Pale brown soluble pigment.
11. Milk (30°C):
    Growth cream-colored to brown rings; no aerial mycelium. Pale brown soluble pigment. Becomes transparent from the upper layer portion, and has weak peptonization action.
12. Potato (27°C):
    Growth grayish yellow, wrinkled; white powdery mycelium, scant. Soluble pigment grayish brown to grayish black.
13. Tyrosine agar slant (27°C):
    Growth cream-colored; black soluble pigment.

III. Biological properties:

Tyrosinase formation reaction : Positive
Nitrite formation reaction : Positive
Skim milk coagulation reaction : Negative
Skim milk peptonization reaction : Positive (weak)
Starch hydrolysis : Positive (strong)
Gelatin liquefaction reaction : Positive (weak)
Coagulated Loeffler's blood
serum solubility : Negative

IV. Utilizability of carbon sources:

Arabinose +
Dextrin +
Fructose +
Glucose +
Glycerin +

Maltose +
Mannose +
Xylose +
Sodium acetate +
Sodium citrate +
Sodium succinate +
Inositol −
Inulin −
Lactose −
Mannitol −
Salicin −
Raffinose (−)
Rhamnose (−)
Saccharose (−)
Trehalose (−)

Note: + Utilized
− Not utilized
(−) Utilizability doubtful

As mentioned above, the S 15-1 strain forms an aerial mycelium having no whorls or spirals and produces smooth conidia, and is a strain of the chromogenic type which gives an aerial mycelium of white to pale red color, later becoming ash-gray. It shows a cream-colored growth on Czapek's agar, and a colorless growth on glucose-asparagine agar, starch synthetic medium or Ca-malate agar, and is broad in scope of carbon source utilization spectrum.

In view of such characteristics of the S 15 −1 strain, there may be shown as homologous strains *Streptomyces cinnamonensis*, *Streptomyces bikiniensis*, *Streptomyces antibiotics* and *Streptomyces griseocarneus*.

Among these strains, *Streptomyces cinnamonensis* is distinguished from the S 15 −1 strain in that the former develops a salmon pink-colored aerial mycelium on glucoseasparagine agar, whereas the latter shows a colorless growth. *Streptomyces bikiniensis* is distinguished from the S 15 −1 strain in that it produces an amber-colored pigment on glucose-asparagine agar and a pale brown pigment on a synthetic medium. *Streptomyces antibioticus* is distinguished from the S 15 −1 strain in that it shows a white growth on a synthetic medium, develops a greenish gray aerial mycelium on a milk medium, and forms a bluish pigment and shows a brown growth on a potato medium. The known *Streptomyces griseocarneus* more or less differs from the S 15 −1 strain in nitrate reducibility, carbohydrate utilization, etc., but well coincides therewith in other points. From the above results, it has been concluded that the S 15 −1 strain belongs to *Streptomyces griseocarneus*, and is distinguishable from the known strain, and has been designated as *Streptomyces griseocarneus* S 15 −1.

The properties of *Streptomyces griseocarneus* S 15 −1 are as mentioned previously. However, the properties of this strain are liable to be varied as seen in other strains of the genus Streptomyces, and are variable by artificial means using, for example, ultraviolet rays, X-rays, radioactive rays or chemicals. All the thus obtained variants may also be used in the present process so far as they belong to *Streptomyces griseocarneus* and have ability to produce the antibiotic S 15-1.

The antibiotic S 15 −1 is produced from the above described strain according to procedures known in the art. The characteristics of this antibiotic such as physiochemical and biological properties are also known to those skilled in the art, as note, for example, the articles by Arima et al. appearing in "The Journal of Antibiotics," Vol. 25, pages 387 −392 and 471 −472.

The microorganism useful for the preparation of antibiotic 156 B-1 (24010 B-1), classified as a strain of the genus Streptomyces, was isolated from soil collected in Ikeda City, Osaka Prefecture, Japan. A culture of the living organism has been deposited in and is available from the culture collection of the U.S. Department of Agriculture, Northern Regional Research Laboratory (Peoria, Ill.), where is has been assigned the number NRRL 5319.

The microbial characteristics of the microorganism are as follows:

I. Morphological characteristics:

Starch-inorganic salts medium and the potato-glucose medium. Good growth with branching substrate mycelium. Good aerial mycelium abundant with spiral ends (two or more rotations). Sporophores do not form whorls. Spores oval, 0.8 − 0.9 by 1.2 − 1.4 $\mu$ in size and smooth on the surface.

II. Behavior on various culture media:

1. Czapek's agar:
   Good growth, white surface circumference with bluish ash-gray interior and ivory reverse. Aerial mycelium somewhat bluish ash-white powder, abundant. No soluble pigment.
2. Asparagine-glucose agar:
   Growth somewhat suppressed; substantially colorless, glossy surface. No aerial mycelium. No pigment production.
3. Ca-malate agar:
   Good growth, substantially colorless, later becoming bright ash-gray. Aerial mycelium powdery and ash-gray. No pigment production.
4. Glucose-Czapek broth:
   Moderate surface growth, dark gray. Aerial mycelium scant, ash-gray. No pigment production.
5. Nutrient agar:
   Moderate, flat growth, milky brown, no aerial mycelium. Scant brown pigment.
6. Loeffler's serum:
   Poor growth, bluish black on the first to second day, later becoming milky brown. No aerial mycelium. No soluble pigment production.
7. Peptone-glucose agar:
   Good growth with wrinkled colonies, grayish pale brown. No aerial mycelium. Scant yellowish brown pigment.
8. Egg-albumin agar:
   Grayish white growth with powdery, ash-gray mycelium. No pigment production.
9. Gelatin:
   Surface growth, slightly brownish white, gelatin liquefaction. Scant brown pigment.
10. Starch agar:
    Good growth, yellowish green reverse and slightly whitish circumference. Aerial mycelium abundant, pale purple, powdery. No pigment production.
11. Tyrosin agar:
    Growth restricted to flat small colonies. Aerial mycelium slightly grayish, powdery. Active melanin formation.
12. Litmus milk:
    Surface growth of grayish cream color. Milk peptonized without coagulation.
13. Cellulose medium:
    No growth.

III. Utilization of Carbon Sources:

Glucose ++
Sucrose ++
Galatose ++
Maltose ++
Xylose +
Arabinose +
Fructose +
Rhamnose +
Raffinose +
Mannitol +
Inositol (−)
Lactose +
Inulin +
Sorbitol +
Sodium succinate (−)
Sodium citrate (−)
Salicin −
Sodium acetate −

Note: ++ fully utilized

The various properties described above clearly indicate that the present microorganism possesses features which are characteristic of microorganisms belonging to the genus Streptomyces.

These properties have been studied in comparison with the properties of numerous microorganisms of genus Streptomyces described in Bergy's "Manual of Determinative Bacteriology" 7th edition (1957) and Waksman's "The Actinomycetes" 2nd edition (1961). As a result, it is found that in morphological characteristics, the present microorganism resembles *Streptomyces albus* and *Streptomyces calvus* with respect to the points that the sporophores are not branched in whorl but have their ends spiral several rotations in the starch-inorganic salts medium and the potato-glucose medium, that the spores are smooth on the surface and are elliptical, and that the pigment-producing ability is extremely weak in protein-containig media and practically absent in synthetic media. However, the present microorganism shows high melanin-producing ability in the tyrosine agar medium, whereas the said species produce no melanin. Further, the present microorganism is characterized by producing aerial mycelium in bright purple color or bright purple color tinged slightly with rose color on the starch-agar medium, whereas the known species mentioned above have white or grayish aerial mycelium on the same medium. In these points, the present microorganisms can be clearly discriminated from the two strains mentioned above.

Strains productive of water-soluble basic antibiotic substances similar to Antibiotic 156 B-1 have been discovered in *Streptomyces lavendulae* and variants thereof. In morphological and physiological characteristics, these strains bear resemblance to *Streptomyces* No. 156. However, they can be clearly discriminated with respect to the following points. The strains of *Streptomyces lavendulae* invariably are highly productive of brown pigments in protein-containing media, while the present microorganism shows a very poor pigment-producing ability in protein-containing media. As concerns the color of the aerial mycelium formed on various media, the strains of *Streptomyces lavendulae* form aerial mycelia of rather dark colors such as ash-brown, yellow-brown, or pale-purple while the present microorganism generally forms aerial mycelia of ash-white color in most cases in media other than starch medium.

Accordingly, the present microorganism has been judged to be a new strain and, therefore, has been designated as Streptomyces No. 156.

For the purpose of the present invention, not merely Streptomyces No. 156 but also natural and artificial mutants thereof can be used.

The antibiotic 156 B-1 (24010 B-1) is produced from the above described strain according to procedures known in the art. The characteristics of this antibiotic such as physico-chemical and biological properties are also known to those skilled in the art, as note, for example, the article by Shimojima et al. appearing in, "The Journal of Antibiotics," Vol. 25, pages 604–606.

The following examples are illustrative of the taeniacidal properties of the antibiotics set forth above.

Example 1

Efficacy of the Antibiotic S 15 −1 Against Natural Taenia taeniaeformis, Dipylidium caninum, and Spirometra mansonoides Infections in Cats Twenty-two female and fourteen male naturally infected cats were used for testing.

The presence of tapeworm infection before treatment was determined in each cat by the evidence of tapeworm proglottids in the feces or by the presence of tapeworm eggs on sugar flotation. The cats were fasted overnight before medication and the regular feeding was resumed three hours after medication. The cats were weighed immediately before dosing. The taeniacidal compound, the antibiotic S 15 −1, was weighed to the nearest 5 mg. and placed in gelatine capsules and given to each cat as a single oral dose.

Total fecal collections were made from each cat daily for seven days. The fecal material was soaked in water for one to two hours, washed through a 40-mesh sieve using a water spray and the worms (scoleces, strobilae and proglottides) were recovered. Seven days after medication the cats were sacrificed after overnight fasting, the intestines were removed and examined for worms. The intestinal contents and mucosal scrapings were washed through a 40-mesh sieve and were examined for worms under the dissecting microscope (10 to 30 × magnification).

Taeniacidal efficacy was based on complete tapeworm removal. From the practical point of view, if over 90% of tapeworms are removed from a cat the treatment has to be repeated due to the regrowth of the remaining worms. Therefore, if one scolex or tapeworm was recovered at necropsy the efficacy was zero. The following formula was used to calculate the efficacy:

$$\text{Percent efficacy} = \frac{\text{number of cats cleared}}{\text{number of cats treated}} \times 100$$

The taenaicidal efficacy and related data are listed in the following tables.

TABLE 1

| Dose mg/kg | Cats treated No. | Sex male | Sex female | Body weight kg | Species of tapeworms identified Before treatment T. taeniaeformis | Species of tapeworms identified Before treatment D. caninum | Species of tapeworms identified At necropsy T. taeniaeformis | Species of tapeworms identified At necropsy D. caninum |
|---|---|---|---|---|---|---|---|---|
| | | | | | No. of cats | | | |
| 15* | 9 | 3 | 6 | av. 3.1 (1.8 – 5.0) | 5 | 5 | 1 | 1 |
| 22.5 | 4 | 3 | 1 | av. 3.7 (2.7 – 4.7) | 3 | 1 | 0 | 0 |
| 30 | 8 | 5 | 3 | av. 3.3 (2.6 – 3.9) | 7 | 3 | 0 | 2 |
| 37.5 | 8 | 1 | 7 | av. 2.4 (1.8 – 3.2) | 3 | 6 | 0 | 2 |
| 45 | 8 | 2 | 6 | av. 2.7 (2.3 – 3.4) | | 8 | | 1 |

*S. mansonoides was found in one cat in this group before treatment but was not present at necropsy.

TABLE 2

| Dose mg/kg | T. taeniaeformis No. of cats Treated | T. taeniaeformis No. of cats Cleared | T. taeniaeformis Efficacy % | D. caninum No. of cats Treated | D. caninum No. of cats Cleared | D. caninum Efficacy % | Combined Infections (T. taeniaeformis and D. caninum) No. of cats Treated | Combined Infections No. of cats Cleared | Combined Infections Efficacy % |
|---|---|---|---|---|---|---|---|---|---|
| 15 and over* | 18 | 17 | 94 | 23 | 17 | 74 | 37 | 31 | 84 |
| 22 and over | 13 | 13 | 100 | 18 | 13 | 72 | 28 | 24 | 86 |
| 30 and over | 10 | 10 | 100 | 17 | 12 | 71 | 24 | 20 | 83 |
| 37 and over | 3 | 3 | 100 | 14 | 11 | 79 | 16 | 13 | 81 |
| 45 and over | | | | 8 | 7 | 88 | 8 | 7 | 88 |

*100% efficacy for S. mansonoides

EXAMPLE 2
Efficacy of the Antibiotics S 15 –1 Against Natural Taenia pisiformis and Dipylidium caninum Infections in Dogs Forty-nine female and twenty-nine male naturally parasitized mongrel dogs of various ages were used for testing. Taenia pisiformis was present in 43 dogs, Dipylidium caninum in 25 and both species of tapeworms were present in 10 dogs. The taeniacidal efficacy of the compound in dual infections was evaluated against both species of tapeworm and therefore the total number of treatments listed under T. pisiformis and D. caninum is larger than the total number of dogs treated.

The procedure for determining the presence of tapeworm infection before treatment, the manner of administration of the taeniacidal compound, the method of worm recovery, and the formula used for determining per cent efficacy are as described in Example 1.

TABLE 1

| Dose mg/kg | Dogs treated No. | Sex male | Sex female | Body weight kg | Species of tapeworms identified Before treatment T. pisiformis | Species of tapeworms identified Before treatment D. caninum | Species of tapeworms identified At necropsy T. pisiformis | Species of tapeworms identified At necropsy D. canium |
|---|---|---|---|---|---|---|---|---|
| | | | | | No. of dogs | | | |
| 9 | 8 | 2 | 6 | av. 10.1 (7.7 – 12.6) | 4 | 6 | 2 | 2 |
| 12.5 | 2 | 1 | 1 | av. 10.45 (10.4 – 10.5) | 0 | 2 | 0 | 1 |
| 15 | 7 | 3 | 4 | av. 9.6 (7.9 – 11.3) | 5 | 4 | 0 | 3 |
| 18 | 1 | | 1 | 8.2 | 1 | 0 | 0 | 0 |
| 20 | 16 | 7 | 9 | av. 10.4 (6.7 – 14.1) | 13 | 4 | 1 | 3 |
| 25 | 8 | 1 | 7 | av. 10.0 (7.8 – 12.2) | 8 | 3 | 0 | 1 |
| 30 | 10 | 5 | 5 | av. 10.2 (7.2 – 13.2) | 6 | 4 | 0 | 0 |
| 35 | 11 | 3 | 8 | av. 8.4 (5.9 – 11.0) | 10 | 3 | 0 | 1 |
| 50 | 11 | 5 | 6 | av. 8.7 (5.4 – 12.0) | 3 | 8 | 0 | 0 |
| 100 | 1 | | 1 | 14.8 | 1 | 0 | 0 | 0 |
| 200 | 3 | 2 | 1 | av. 11.0 | 2 | 1 | 0 | 0 |

TABLE 2

| Dose | Taenia pisiformis | | | Dipylidium caninum | | | Combined Infections (T. pisiformis and D. Caninum) | | |
|---|---|---|---|---|---|---|---|---|---|
| | No. of dogs | | Efficacy | No. of dogs | | Efficacy | No. of dogs | | Efficacy |
| mg/kg | Treated | Cleared | % | Treated | Cleared | % | Treated | Cleared | % |
| 18 and lower | 10 | 8 | 80 | 12 | 6 | 50 | 18 | 11 | 61 |
| 20 and higher | 43 | 42 | 98 | 23 | 18 | 78 | 60 | 55 | 92 |
| 25 and higher | 30 | 30 | 100 | 20 | 18 | 90 | 44 | 42 | 95 |
| 30 and higher | 22 | 22 | 100 | 16 | 15 | 94 | 36 | 35 | 97 |
| 35 and higher | 16 | 16 | 100 | 13 | 12 | 92 | 26 | 25 | 96 |
| 50 and higher | 6 | 6 | 100 | 9 | 9 | 100 | 15 | 15 | 100 |

EXAMPLE 3

Efficacy of the Antibiotic S 15 −1 Against Natural Moniezia expansa and Moniezia benedeni Infections in Sheep Two sheep naturally parasitized with Moniezia expansa and Moniezia benedeni tapeworms received a single dose of 25 mg./kg. of the antibiotic S 15 −1 in gelatin capsules after overnight fasting. The procedures set forth in Example 1 were followed and it was determined that destrobilization of the tapeworms occurred. Another sheep treated with 35 mg./kg. was found to be completely cleared of tapeworms with no scolices being recovered at necropsy.

EXAMPLE 4

Efficacy of the Antibiotic 156 B-1 (24010 B-1) Against Natural Taenia pisiformis and Dipylidium caninum Infections in Dogs One dog naturally parasitized with Taenia pisiformis tapeworm received a single dose of 50 mg./kg. of the antibiotic 156 B-1 in gelatine capsules after overnight fasting. Total fecal collections were made twice a day for 7 days and they were examined for passing tapeworms. Seven days after medication the dog was sacrificed and the intestinal contents and mucosal scrapings were examined for worms under the dissecting microscope. There were no tapeworms present in necropsy.

Another dog naturally infected with Taenia pisifomis and Dipylidium caninum received a single oral dose of 25 mg./kg. of the antibiotic 156 B-1. At necropsy there were no Taenia pisiformis tapeworms found but one destrobilized Dipylidium caninum was recovered.

EXAMPLE 5

Efficacy of the Antibiotic Streptothricin Against Hymenolepis nana in Mice

Female mice weighing 16 to 18 grams were orally inoculated with the tapeworm Hymenolepis nana. 500 plus eggs were inoculated into each mouse. 16 days after infection, the mice were treated for three consecutive days with a dosage of 200 mg./kg./day by gavage. The results are summarized in the following table.

| Test compound | Dose | Worms recovered[1] | | | |
|---|---|---|---|---|---|
| | mg./kg. | animal number | | | |
| | | 1 | 2 | 3 | 4 |
| control | — | + | + | + | + |
| Streptothricin | 3 × 200 | +[2] | DS | DS | — |

[1] + = no reduction
DS = tapeworms destrobilized
− = no worms present
[2] Died after one dose

EXAMPLE 6

Efficacy of the Antibiotic Streptothricin Produced from Streptomyces lavendulae Against Hymenolepis nana in Mice Streptomyces lavendulae ATCC 8664 is a known microorganism available from the culture collection of the American Type Culture Collection (Rockville, Maryland) which has been reported as producing the antibiotic streptothricin. The procedure followed for isolation of the streptothricin utilizes ion exchange chromatography, a procedure commonly employed with antibiotics of the streptothricin class.

To produce the antibiotic, tomato paste-oatmeal agar slants were seeded with Streptomyces lavendulae ATCC 8664. The slants were incubated 10 to 14 days and then used to inoculate 100 ml. of aqueous soybean meal medium contained in 500 ml. Erlenmeyer flasks. The composition of the germinatioin medium was:

| | Grams |
|---|---|
| Toasted Nutrisoy Flour | 15 |
| Hi Starch | 15 |
| Glucose | 50 |
| $CoCl_2.6H_2O$ | 0.005 |
| $CaCO_3$ | 10 |
| Distilled water to 1,000 ml. | |

The medium was sterilized for 30 minutes at 121°C and at 15 lbs. steam pressure.

The germination flasks were incubated at 25°C for 96 hours on a rotary shaker, operating at 280 r.p.m. with a 2 inch throw.

A 5% (v/v) transfer was made from the germination flask to 500 ml. Erlenmeyer flasks containing 100 ml. of the same medium used for the germination flasks. The fermentation flasks were incubated and agitated as were the germination flasks. After 168 hours of incubation, the contents of the flasks were pooled, and the resulting broth pool was adjusted to pH 3 by the addition of 6N hydrochloric acid. The cells were separated from the supernatant fluid by centrifugation and the supernatant fluid was adjusted to pH 7 by the addition of concentrated ammonium hydroxide.

Eight liters of supernate was added to a column of ion-exchange resin, IRC-50, $(NH_4)^+$, 5 cm × 60 cm, to adsorb the antibiotic onto the resin. After washing the resin with 8 liters of water, the antibiotic was eluted with 1N ammonium hydroxide. The chromatographic fractions, 15 ml each, were conveniently followed by paper-disc, agar diffusion assay against *Escherichia coli* ATCC 10536. The active fractions were pooled (200 ml.) and concentrated in vacuo to approximately 50 ml. Twenty volumes of acetone were added to the concentrate and the suspension incubated at 5°C overnight. The supernate fluid was removed by decantation and centrifugation. The precipitate was dissolved in approximately 5 ml. of water giving a concentrated solution of the antibiotic.

Mice, infected as described in Example 5, were treated for three conscutive days with a dosage of 0.5 ml. per day by gavage of the concentrated streptothricin preparation described above. The results are summarized in the following table.

| Test compound | Dose | Worms recovered | % Clearance |
|---|---|---|---|
| | | animal number | |
| | | 1  2  3  4 | |
| control | — | + + + + | — |
| Streptothricin concentrate | 3 × 0.5 ml. | — — — — | 100% |

What is claimed is:

1. A method of treating a mammalian host infected with tapeworms which comprises administering to the host a therapeutically effective dose of an antibiotic selected from the group consisting of streptothricin, S 15 −1, 156 B−1 and mixtures thereof.

2. The method of claim 1 wherein the antibiotic is streptothricin.

3. The method of claim 1 wherein the antibiotic is S 15 −1.

4. The method of claim 1 wherein the antibiotic is 156 B−1.

5. The method of claim 1 wherein the antibiotic is encapsulated within a gelatin capsule and is administered to the host orally.

6. The method of claim 1 wherein the antibiotic is formulated within a tablet or suspension and administered to the host orally.

7. The method of claim 1 wherein the antibiotic is administered in a dosage of about 5 to about 200 mg. per kilogram of body weight per day.

8. The method of claim 7 wherein the dosage is from about 25 to about 100 mg. per kilogram of body weight per day.

9. The method of claim 1 wherein the host is a dog.

10. The method of claim 1 wherein the host is a cat.

11. The method of claim 1 wherein the host is a sheep.

* * * * *

UNITED STATES PATENT OFFICE
CERTIFICATE OF CORRECTION

PATENT NO. : 3,876,778
DATED : April 8, 1975
INVENTOR(S) : Joseph Szanto et al.

It is certified that error appears in the above-identified patent and that said Letters Patent are hereby corrected as shown below:

Col. 3, line 31, "antibiotics" should read --antibioticus--.

Col. 5, line 40, "containig" should read --containing--.

Col. 5, line 50, "microorganisms" should read --microorganism--.

Col. 6, line 29, "Twenty-two" should read --Twenty-three--.

Col. 7, line 36, "Antibiotics" should read --Antibiotic--.

Col. 9, line 50, "in" should read --at--.

Signed and sealed this 1st day of July 1975.

(SEAL)
Attest:

RUTH C. MASON
Attesting Officer

C. MARSHALL DANN
Commissioner of Patents
and Trademarks